(12) United States Patent
Bossenmaier et al.

(10) Patent No.: US 6,279,942 B1
(45) Date of Patent: Aug. 28, 2001

(54) AIR BAG MODULE HOUSING

(75) Inventors: Alban Bossenmaier, Gäufelden-Nebringen; Jörg Henkel, Göppingen; Friedrich Reiter, Sindelfingen; Harald Rudolf, Tübingen; Martin Steiner, Grafenau, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/438,388

(22) Filed: Nov. 12, 1999

(30) Foreign Application Priority Data

Nov. 11, 1998 (DE) .............................. 198 51 975

(51) Int. Cl.[7] .................................................. B60R 21/16
(52) U.S. Cl. ........................................ 280/728.2; 280/732
(58) Field of Search .......................... 280/728.2, 728.3, 280/752, 731, 730.2, 732

(56) References Cited

U.S. PATENT DOCUMENTS

| 5,342,082 | 8/1994 | Kriska et al. . | |
|---|---|---|---|
| 5,395,133 | 3/1995 | Lauritzen et al. . | |
| 5,419,583 | * 5/1995 | Sakakida et al. | 280/728.2 |
| 5,431,439 | * 7/1995 | Amamori et al. | 280/732 |
| 5,482,313 | * 1/1996 | Ikeya et al. | 280/728.2 |
| 5,503,427 | * 4/1996 | Ravenberg et al. | 280/728.3 |
| 5,505,484 | * 4/1996 | Miles et al. | 280/728.2 |
| 5,533,747 | * 7/1996 | Rose | 280/728.2 |
| 5,697,637 | 12/1997 | Milne, III . | |
| 5,826,901 | * 10/1998 | Adomeit | 280/728.2 |

FOREIGN PATENT DOCUMENTS

| 0 748 723 | 6/1995 | (EP) . |
| 0 666 203 | 8/1995 | (EP) . |
| 0 734 914 | 10/1996 | (EP) . |
| 0 776 799 | 6/1997 | (EP) . |
| 0 818 361 | 1/1998 | (EP) . |
| 2-155855 | 6/1990 | (JP) . |
| 3032526 | 10/1996 | (JP) . |
| 91/14110 | 9/1991 | (WO) . |

* cited by examiner

Primary Examiner—Kenneth R. Rice
Assistant Examiner—Lynda Jasmin
(74) Attorney, Agent, or Firm—Crowell & Moring, L.L.P.

(57) ABSTRACT

An air bag module housing for a motor vehicle has an oblong basic housing body which is used for receiving a gas generator and an air bag and which is laterally closed by two side covers. The air bag module housing is deformed in the event of an impact of a part of the body, particularly of the head, of a vehicle occupant. In order to optimize deformation of the air bag module housing, at least one slot respectively is provided in the side covers. The slot extends essentially perpendicularly to the expected impact direction of the body part along the largest part of the respective side cover to the edge.

6 Claims, 4 Drawing Sheets

AIR BAG MODULE HOUSING

BACKGROUND OF THE INVENTION

This application claims priority of DE 198 51 975.3, filed Nov. 11, 1998, the disclosure of which is expressly incorporated by reference herein.

The present invention relates to an air bag module housing for a motor vehicle, having an oblong basic housing body which is used for receiving a gas generator and an air bag and which is laterally closed by two side covers. The air bag module housing is deformable in the event of an impact of a part of the body, particularly of the head, of a vehicle occupant.

Known air bag module housings are described, for example, in European Patent Document No. EP 0 666 203 A1, U.S. Pat. Nos. 5,395,133 and 5,342,082. In European Patent No. EP 0 666 203 A1 and U.S. Pat. No. 5,395,133, energy-absorbing elements are to be mounted on the edges of the basic housing body. As the result, the shock in the event of an impact of a vehicle occupant's head is to be damped. In U.S. Pat. No. 5,342,082, the same object is to be achieved by recessing oval openings in the side covers. In addition, V-shaped incisions are made in the edge area of the side covers.

It has been discovered that a modification of the basic housing body alone is not sufficient for ensuring a satisfactory deformation of the air bag module housing. The construction of openings or V-shaped incisions in the side covers results in the risk that, when inflating, the air bag may become hung up therein and tear. In addition, the side covers may break in the areas between the openings or incisions when highly stressed, which results in breaking edges which may cause injury.

For optimizing the deformation of the air bag module housing, EP 0 734 914 B1 and European Patent Document EP 0 818 361 A1 suggests thermally weakening individual areas in the basic housing body. As a result, the moment of resistance is to be reduced in a targeted manner. The thermal weakening of individual areas has the disadvantage, however, that their quality or the presence cannot necessarily be recognized. WO 91/14 110 also relates to the thermal weakening of energy-absorbing structures.

SUMMARY OF THE INVENTION

An object of the present invention is to optimize the deformation of the air bag module housing. In addition, the air bag module housing according to the invention is manufacturable in a simple manner and at reasonable cost. Damage to the air bag during inflation is to be prevented. In particular, the criteria of the so-called head impact test are to be met.

These objects have been achieved by providing an air bag module housing for a motor vehicle having an oblong basic housing body, which is used for receiving a gas generator and an air bag and which is laterally closed by two side covers. The air bag module housing is deformed in the event an impact of a part of the body, particularly of the head, of a vehicle occupant, by making at least one slot respectively in the side covers. The slot extends essentially perpendicularly to the expected impact direction of the part of the body along the largest part of the respective side cover to the edge. The slot is formed by two mutually adjoining edges of the respective side cover. These edges form almost no surface of attack for the air bag during the inflating.

As a result, damage to the air bag during inflation are reliably prevented. With the arrangement of the slot essentially perpendicular to the expected impact direction of the part of the body along the largest part of the respective side cover, the resistance of the side cover with respect to a deformation during the impact is reduced. At the end of the slot, the still remaining material of the side cover represents a rotating area about which the two parts of the side cover, which are separated by the slot, rotate in a hinge-like. The torsional resistance can be varied by the amount of the remaining material of the side cover or the length of the slot.

A special embodiment of the invention provides the slot with a through-construction. As a result, the resistance of the side cover to a deformation in the area of the slot is virtually reduced to zero.

Another special embodiment of the invention provides that the side covers have slightly bent sections on one side, preferably on the side of the slot facing away from the gas generator. The bent sections ensure that the two parts of the side cover separated from one another by the slot slide past one another, in the event of a deformation of the air bag module housing.

Still another special embodiment of the invention provides that the cross-section of the basic housing body has at least one bulge at the level of the slot in the side covers. In a construction of side covers with through-slots, two opposite bulges are constructed in the basic housing body. If the slots are not formed in a through-shape in the side covers, the bulge is arranged only on the side of the slot. The bulge provides a defined deformation of the basic housing body. The bulge may, for example, have a semicircular or a triangular cross-section. As an alternative, a thermal weakening of individual areas of the basic housing body may also be provided.

Yet another special embodiment of the invention provides that the wall thickness is reduced in the area of the bulge. This reduces the resistance in the basic housing body against a deformation.

Another special embodiment of the invention provides that the side parts are fastened on the basic housing body by screws or rivets. As the result of the screws or rivets, forces are introduced from the basic housing body into the side covers in the event of a deformation. Alternatively, this can also be achieved by a form closure between the basic housing body and the side covers. The precise placing of the screws or rivets or of the form closure influences the deformation behavior.

BRIEF DESCRIPTION OF THE DRAWINGS

Other objects, advantages and novel features of the present invention will become apparent from the following detailed description of the invention when considered in conjunction with the accompanying drawings.

FIG. 1 shows an air bag module housing designated generally by reference numeral 1. The air bag module housing 1 is fastened in a known manner to a cross member under a dashboard 2 and/or on the dashboard 2 itself. The air bag module housing 1 comprises a basic housing body 3 with a cylindrical partial area 4 which is used for receiving a gas generator. In the basic housing body 3, two oblong recesses 5, 6 are provided which are used for receiving known anchoring elements of an air bag. On its longitudinal side, the basic housing body 3 is closed off by a covering 7 in the direction of the dashboard 2.

Figure 1:
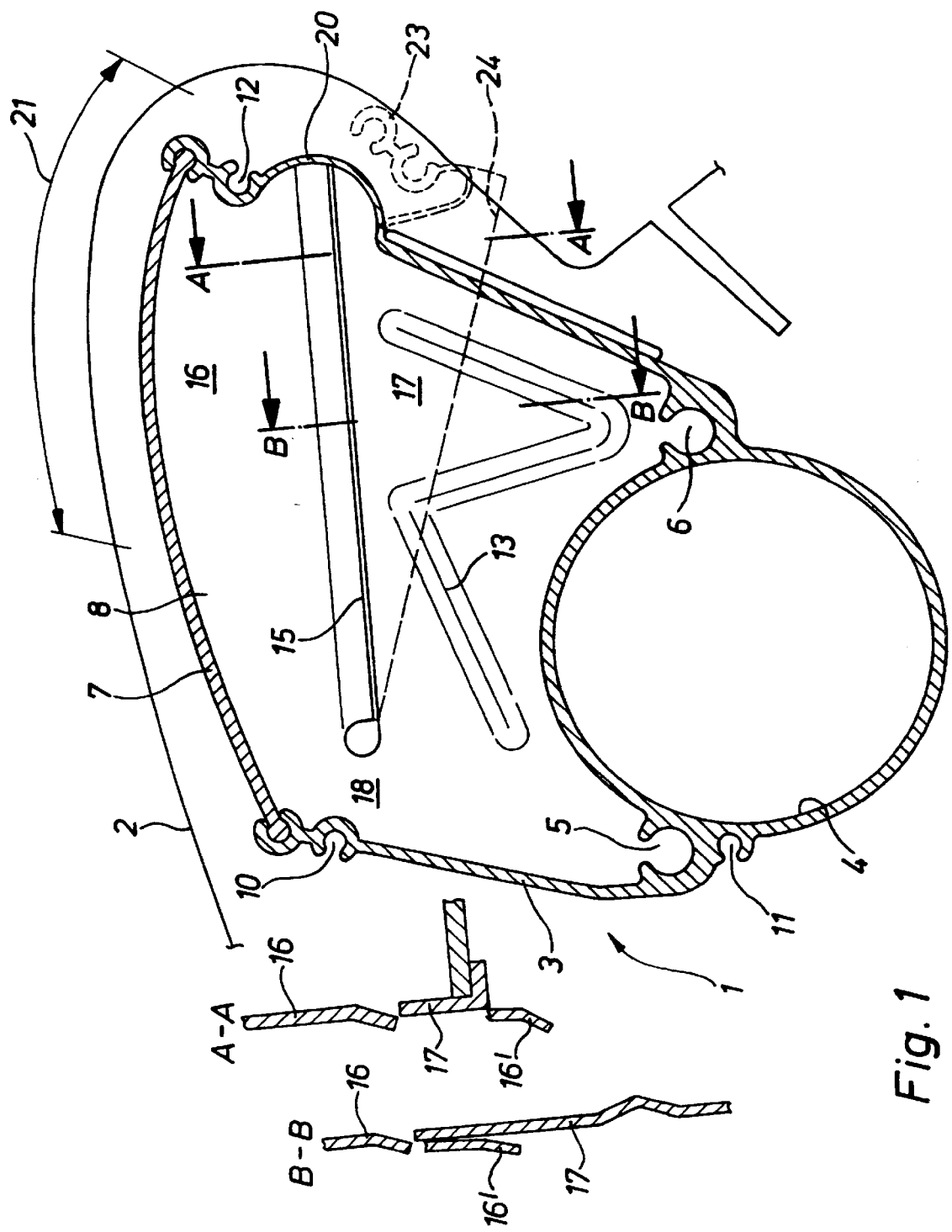
FIGS. 1 to 4 are partial cross-sectional view of four embodiments of the air bag module housing according to the present invention.

The basic housing body 3 is laterally closed by two side covers, of which only one side cover 8 is illustrated in FIG.

1. The contour of the side cover 8 is not illustrated in FIG. 1 because otherwise the cross-section of the basic housing body 3 would not be visible. The side cover 8 is fastened on the basic housing body 3 by screws which are received in the oblong recesses 10, 11 and 12 in the basic housing body 3. For stabilizing the side cover 8, a zigzag-shaped lockbeading 13 is constructed therein.

A slot 15 divides the side cover 8 into two parts 16, 17 which are connected with one another at a location 18. At the open end of the slot 15 in the side cover 8, a semicircular bulge 20 with a reduced thickness is formed in the basic housing body 3. If, for example, a vehicle occupant's head impacts in a region 21, the basic housing body 3 will deform, as indicated by the dash lines designated by reference numeral 23. The side cover 8 connected with the basic housing body 3 also deforms in the process. The deformation of the side cover 8 is such that the part 16 of the side cover 8 slides over the part 17 of the side cover 8, as illustrated in dash lines designated by reference numeral 24.

In the additional sectional views A—A, B—B used for clarification purposes, the original position of the first part of the side cover 8 is designated by reference numeral 16 and the position after the deformation is designated by reference numeral 16'. The sectional views A—A and B—B also show that the first part 16 of the side cover 8 has a slightly bent construction at the slot edge. This improves the sliding of the parts 16, 17 of the side cover 8 on one another.

Figure 2:
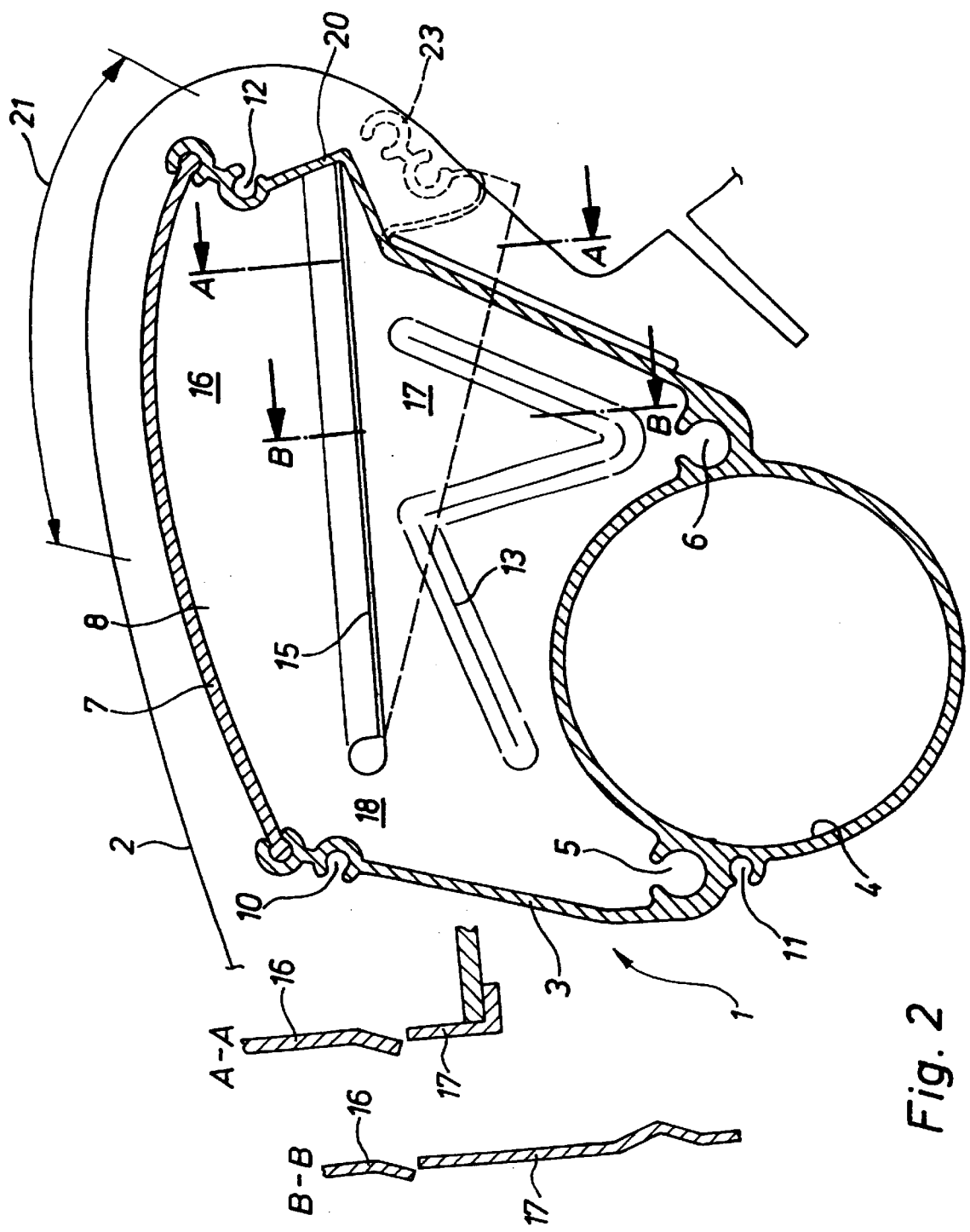

The second embodiment of an air bag module housing 1 according to the invention illustrated in FIG. 2 is similar to the embodiment illustrated in FIG. 1. For reasons of simplicity, identical parts use the same reference numerals. In order to avoid repetition, reference is made to the above description of FIG. 1 for the identical parts. In contrast to the embodiment illustrated in FIG. 1, however, the embodiment illustrated in FIG. 2 is such that, the bulge 20 has triangular construction instead of a semicircular configuration.

Figure 3:
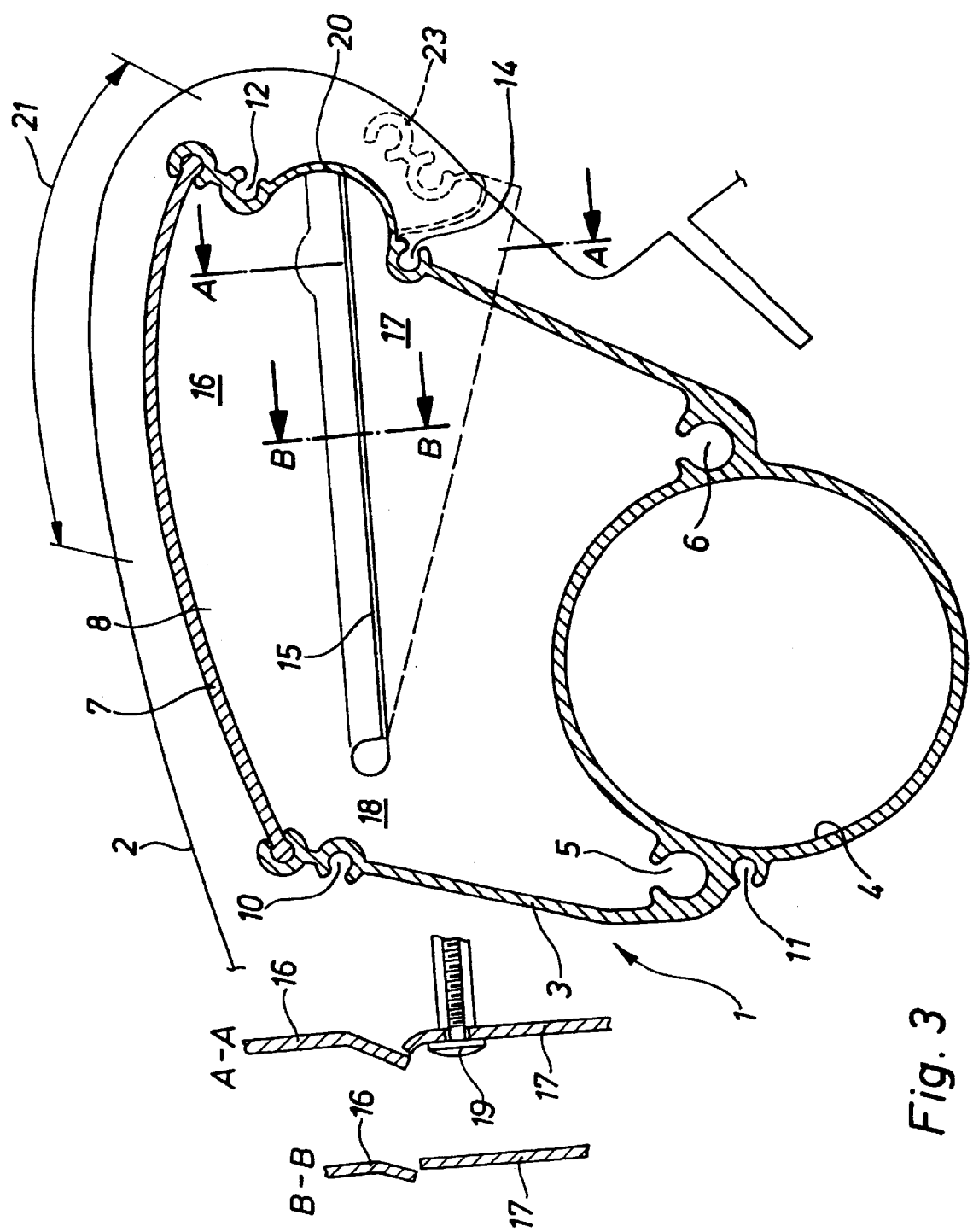

The embodiment of an air bag module housing 1 according to the invention illustrated in FIG. 3 differs from the above-described embodiments in that the part 17 of the side cover 8 is fastened at its edge pointing to the bulge 20, in addition, on the basic housing body 3. The fastening takes place by way of a screw 19 which is received in an oblong recess 14 of the basic housing body 3. Of course, a passage hole for the screw is provided in the side cover 8 as the corresponding point. This embodiment has the advantage that part 17 of the side cover 8 remains in position during a deformation of the part 16.

Figure 4:
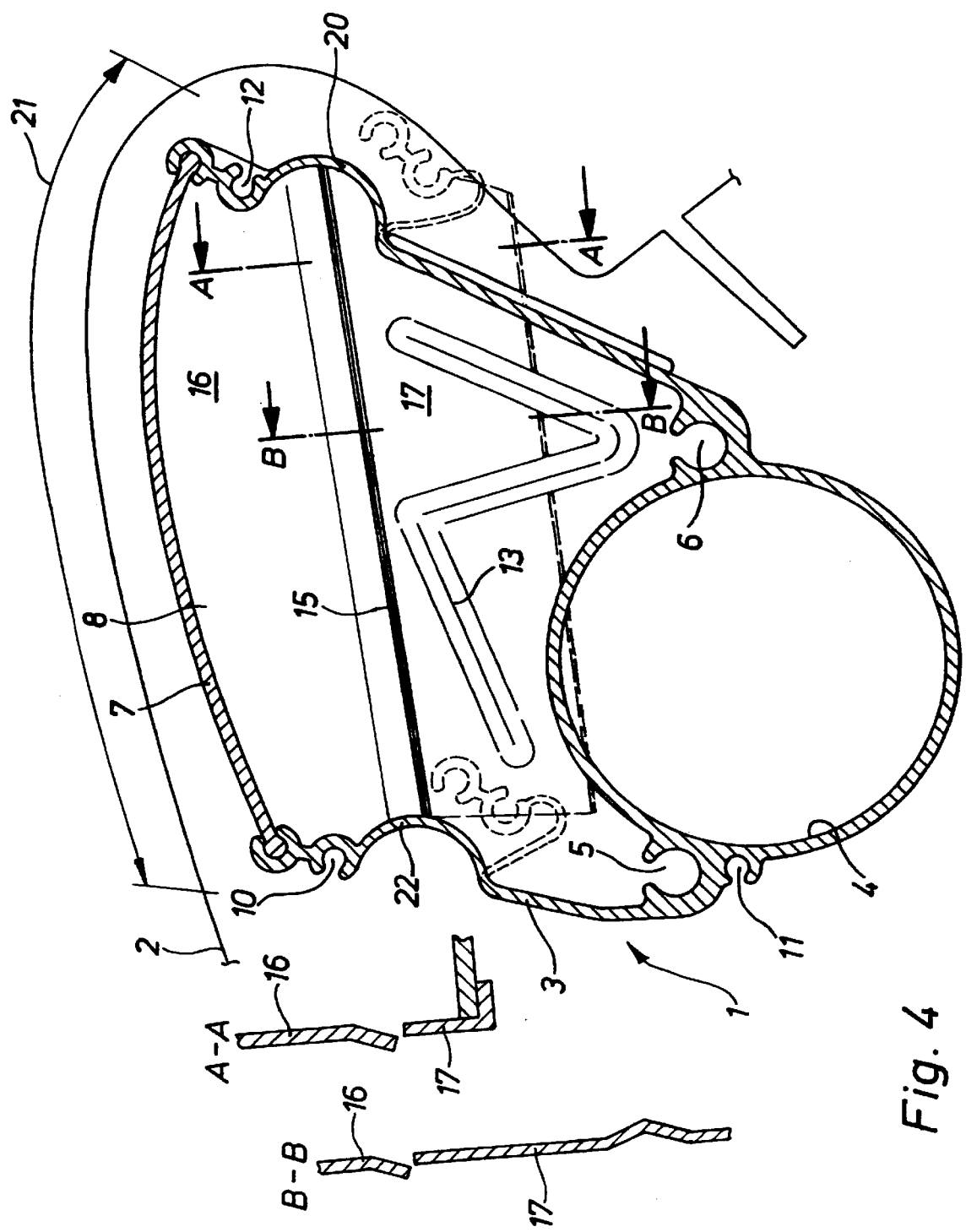

The fourth embodiment of an air bag module housing 1 according to the invention illustrated in FIG. 4 differs from the preceding embodiments in that a through-slot 15 is provided in the side cover 8. That is, the area 18, which connects the two parts 16, 17 of the side cover 8 with one another, is eliminated. In the area of the slot 15, the basic housing body 3 is provided with a bulge 22 in addition to the bulge 20. For a better understanding, the deformed position of the bulges is indicated by broken lines.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air bag module housing for a motor vehicle, comprising an oblong basic housing body configured to be used for receiving a gas generator and an air bag, to be laterally closed by two side covers, and to be deformable during an impact of a part of a person's body, wherein at least one slot is provided in each of the side covers and extends substantially perpendicular to an expected impact direction of the part of the body along a largest part of the respective side cover to an edge of the side cover such that, in the event of an impact a portion of a wall of the side cover on one side of the at least one slot is caused to overlap another portion of the wall of the side cover on another side of the at least one slot.

2. The air bag module housing according to claim 1, wherein the at least one slot has a through-construction.

3. The air bag module housing according to claim 1, wherein the side covers have slightly bent a side of the slot facing away from the gas generator.

4. The air bag module housing according to claim 3, wherein the housing body has a cross-section with at least one bulge at a lever of the slot in the side covers.

5. The air bag module housing according to claim 4, wherein wall thickness of the housing body is reduced in the area of the bulge.

6. The air bag module housing according to claim 1, wherein screws or rivets are provided to fasten the side covers to the housing body.

\* \* \* \* \*